United States Patent

Lysell et al.

[11] Patent Number: 5,520,961
[45] Date of Patent: May 28, 1996

[54] PLASTISOL-BASED COATING COMPOSITION

[75] Inventors: Lennart Lysell; Lars Malmbom, both of Sundsvall, Sweden

[73] Assignee: Casco Nobel AB, Stockholm, Sweden

[21] Appl. No.: 347,292

[22] PCT Filed: Jun. 1, 1993

[86] PCT No.: PCT/SE93/00482

§ 371 Date: Dec. 1, 1994

§ 102(e) Date: Dec. 1, 1994

[87] PCT Pub. No.: WO93/24581

PCT Pub. Date: Dec. 9, 1993

[30] Foreign Application Priority Data

Jun. 3, 1992 [SE] Sweden ................................. 9201721

[51] Int. Cl.$^6$ ................................. C08J 9/22; C08J 9/32; B05D 7/14; B05D 1/02
[52] U.S. Cl. .................. 427/385.5; 427/409; 427/421; 427/373; 521/76; 521/78; 521/94; 521/98
[58] Field of Search ........................ 427/373, 409, 427/421, 385.5; 521/54, 76, 78, 94, 98

[56] References Cited

U.S. PATENT DOCUMENTS

| | | | |
|---|---|---|---|
| 3,615,972 | 10/1971 | Morehouse, Jr. et al. | 156/79 |
| 4,108,806 | 8/1978 | Cohrs et al. | 521/54 |
| 4,456,507 | 6/1984 | Kivel et al. | 427/409 |
| 4,485,192 | 11/1984 | Gibbs et al. | 521/54 |
| 4,504,374 | 3/1985 | Lewarchick et al. | 427/386 |
| 4,902,722 | 2/1990 | Melber | 427/373 |
| 5,155,138 | 10/1992 | Lundqvist | 521/76 |
| 5,209,967 | 5/1993 | Wright et al. | 428/283 |
| 5,475,056 | 12/1995 | Koesters et al. | 427/409 |
| 5,476,879 | 12/1995 | Woods et al. | 427/421 |

FOREIGN PATENT DOCUMENTS

| | | |
|---|---|---|
| 85-281981 | 6/1987 | Japan . |
| 2251439 | 7/1992 | United Kingdom . |

*Primary Examiner*—Diana Dudash
*Attorney, Agent, or Firm*—Burns, Doane, Swecker & Mathis

[57] ABSTRACT

A coating composition suitable as an undercoating for cars contains vinyl-chloride-polymer-based plastisol and expandable thermoplastic microspheres. The expandable thermoplastic microspheres have a substantially halogen-free polymer shell which comprises a copolymer of halogen-free monomers and, in an amount of at least about 80% by weight, nitrile-containing monomers. Preferably, the polymer shell of the thermoplastic microspheres contains from about 85% by weight to about 97% by weight of nitrile-containing monomer. A method for spray-coating a surface with the coating composition by airless spraying is also disclosed.

12 Claims, No Drawings

PLASTISOL-BASED COATING COMPOSITION

The present invention relates to a new coating composition based on vinyl-chloride-polymer plastisol and containing thermoplastic microspheres as filler. More specifically, the invention concerns a coating composition which is especially suitable as an undercoating for cars. The composition contains expandable thermoplastic microspheres having a polymer shell which is substantially halogen-free and is based on nitrile-containing monomers and halogen-free monomers. The invention also relates to a method for spray-coating, as well as the use of the coating composition.

To provide protection against rust and impacts from stones, it is known to treat the chassis and other exposed car components with coating compositions. Conventional coating compositions usually are bituminous compounds or plastisol-based coating compositions. As is also known, polyvinylchloride (PVC) plastisols of improved stone resistance and reduced weight can be obtained by using thermoplastic microspheres as filler in the plastisol composition (see, for instance, DE 40 18 022 and JP 85-281981).

When employed as coating compositions for cars, plastisols are gelatinised in the furnaces used for hardening or drying car paint. Usually, a car body is subjected to several painting and drying operations.

When used as an undercoating for cars, the PVC plastisol is applied by airless spraying. This method effectively spreads the high-viscosity plastisol, but requires very high pressures. Thus, pressures of up to 200 bar are not uncommon. In addition, the spraying systems are dimensioned to keep the high pressure constant for fairly long periods of time, e.g. 200 bar for 3 h. It has, however, been found that expanded low-density microspheres, which are used in the above patent specifications, do not retain this density when subjected to high pressure over long periods of time. To improve the pressure resistance of the microsphere-filled plastisol, it has been suggested to use unexpanded microspheres. These are caused to expand when the plastisol is gelatinised, which results in a so-called foamed PVC plastisol of homogeneous cellular structure, exhibiting the aimed-at low weight and improved resistance to stone impacts. It has however been found that the microspheres collapse when the foamed plastisol is heated to normal gelatinisation temperatures (100°–180° C.). The conventional microspheres used in the plastisol are thus unable to withstand the high temperatures. As a result, the expanding agents of the spheres are released, resulting in a plastisol surface having large pores and being full of large blisters. Also, the collapsed spheres impart high density to the plastisol, thus ruining the advantage of lightness.

As defined by the appended claims, the present invention relates to a coating composition containing vinyl-chloride-polymer-based plastisol and plastisol thermoplastic microspheres. The expandable thermoplastic microspheres have a polymer shell which is substantially halogen-free and comprises a copolymer of halogen-free monomers and, in an amount of at least about 80% by weight, nitrile-containing monomers. This composition is especially suitable for use as an undercoating for cars, but may successfully be used as protective coating also for other surfaces.

It has surprisingly been found that the problems mentioned above can be solved by using a particular type of microspheres in the plastisol. Thus, the coating composition according to the invention is able to withstand high pressures for a long period of time, and can safely be heated to high gelatinisation temperatures for a relatively long period of time. The microspheres expand, but remain intact without collapsing. This results in a PVC coating having a dense, fine surface and very low density. Densities below 1.0 g/cm$^3$ can be obtained without difficulties. This is as good as the use of expanded spheres, but there is no problem of low pressure resistance as in expanded spheres.

The thermoplastic microspheres used in the plastisol-based composition according to the invention have a polymer shell, of which at least 80% by weight of the polymer shell is a nitrile-containing monomer. Preferably from about 85% by weight to about 97% by weight of the polymer shell is a nitrile-containing monomer. However, even an amount of up to 100% by weight is possible. The amount of halogen-free monomer be less than about 20% by weight, and preferably from about 3% by weight to about 15% by weight. By "substantially halogen-free polymer shell" is meant that the copolymer, apart from nitrile-containing monomers and halogen-free monomers, must not contain more than 2% by weight of halogen-containing monomer, such as vinyl chloride and vinylidene chloride. Preferably, the copolymer does not contain any halogen-containing monomer at all. It has been found that this type of microspheres is stable in polyvinyl-chloride plastisols, even in the case of prolonged gelatinisation at high temperatures. Conventional microspheres, on the other hand, are unable to withstand such conditions. Especially good stability is obtained when the microspheres have a content of nitrile-containing monomer of at least 80% by weight.

Nitrile-containing monomers are monomers selected from the group consisting of acrylonitrile, methacrylonitrile, alpha-chloroacrylonitrile, alpha-ethoxyacrylonitrile, fumaronitrile or a mixture thereof. Acrylonitrile and methacrylonitrile are especially preferred.

The halogen-free monomer in the polymer shell of the spheres can be chosen from methacrylic esters, acrylic esters, styrene, vinyl acetate, butadiene, neoprene or mixtures thereof. Preferred comonomers are methylmethacrylate, ethylmethacrylate and methylacrylate.

Conveniently, the polymer shell of the microspheres also contains a crosslinking agent, which can be selected from the group consisting of ethylene glycol dimethacrylate, triethylene glycol dimethacrylate, trialkylformal, allyl methacrylate, 1,3-butyl glycol dimethacrylate, trimethylol propane trimethacrylate, and triallyl isocyanate. The most preferred crosslinking agent is triacylformal. The amount of crosslinking agent should be 0.1–1.0% by weight, preferably 0.2–0.5% by weight.

The microspheres can be prepared in conventional manner, e.g. as described in U.S. Pat. No. 3,615,972. The microspheres are produced by suspension polymerisation, in which the liquid monomer or monomer mixture containing condensed propellant gas is dispersed in an aqueous medium containing a suspending agent and a polymerisation initiator. The resulting microspheres consist of polymer shells containing the liquid, volatile propellant gas. The spheres are expanded by heating to a temperature above the boiling point of the propellant gas and the softening point of the polymer. Suitable initiators are azobisiso butyronitrile, benzoyl peroxide, diisopropyl peroxydicarbonate, t-butyl peroxide, and 2,2-azobis(2,4-dimethyl valeronitrile). The propellant gas should have a boiling point which is lower than the softening point of the polymer. The gas can be chosen from propane, n-butane, isobutane, isopentane, neopentane, n-pentane, hexane, heptane, petroleum ether, and such methane halides as methyl chloride, methylene chloride, trichlorofluoromethane, and dichlorodifluoromethane.

The suspending agent may be colloidal silicic acid, which is commonly used in commercial processes. However, use is advantageously made of powder stabilisers, such as those described in SE 9003600-5. In a preferred embodiment, the microspheres are thus produced in the presence of a powder stabiliser which is a salt or a hydroxide of any one of the metals Ca, Mg, Ba, Fe, Zn, Ni and Mn, and which is insoluble in the aqueous medium at the pH value this has during polymerisation. Suitably, polymerisation takes place at an alkaline pH value.

The particle size of the unexpanded spheres, and consequently of the expanded spheres, may vary. The particle size of unexpanded spheres may, for instance, be 1 µm–1 mm, preferably 2 µm–0.5 mm, and especially 5–50 µm. During expansion, the diameter of the microspheres increases by a factor of 2–5.

PVC plastisols essentially consist of vinyl-chloride-based polymers, plasticisers, fillers, stabilisers, pigments and adhesion promoters. The plastisol is obtained by dispersing a vinyl-chloride-based polymer in the plasticiser and admixing filler and additives. By vinyl-chloride-based polymers are meant homopolymers, such as polyvinyl chloride or polyvinylidene chloride, or copolymers of vinyl chloride or vinylidene chloride of which up to 20% by weight is based on the vinyl chloride or the vinylidene chloride of copolymerisable monomers, such as alkenes, vinyl acetate, vinylidene chloride, acrylic acid or methacrylic acid, acrylates or methacrylates, and vinyl esters etc.

Commonly used plasticisers are phthalic acid esters, dibasic esters, phosphoric acid esters, polyester-based plasticisers and, in particular, dioctyl phthalate and diisononyl phthalate.

Conventional fillers are talcum, calcium carbonate, kaolin, barium sulphate, magnesium carbonate, graphite, silicon dioxide, and rubber.

The amount of thermoplastic microspheres added to the plastisol may vary depending on the desired properties of the final coating. If the amount of microspheres is increased, the density of the coating is reduced. However, there is a risk that the mechanical strength of the coating is reduced, should the microsphere content of the plastisol be too high. Conveniently, the thermoplastic microspheres may be added to the plastisol in an amount of 0.1–5% by weight, preferably 0.5–2% by weight, based on the plastisol. With these contents, there is a good balance between low density and good mechanical properties. The coating composition is produced by mixing the dry, unexpanded microspheres with the plastisol.

The invention also concerns a method for spray-coating a surface with the coating composition according to the invention. In this method, the coating composition is applied by airless spraying, in which the coated composition is fed up to the spray nozzle under a very high pressure. The coating is atomised out into the air when leaving the nozzle. The nozzles employed have an opening of a diameter of about 0.18–1.2 mm. The pressures used are in the order of 100–300 bar. The coating composition can be subjected to such pressures for 1–3 hours before being sprayed.

The coated surface is gelatinised at temperatures of about 100°–180° C., preferably 130°–150° C. The time of gelatinisation may range from a few minutes to a full hour, and preferably is about 20–60 minutes.

The coating composition is especially suitable for use as an anti-corrosive and stone-protecting coating compound for cars. In severe coating conditions, especially involving long time of gelatinisation at high temperatures, use is advantageously made of the plastisol composition containing microspheres having a content of at least 80% by weight of nitrile-containing monomer and being completely halogen-free. It has been found that this coating composition is stable and gives an excellent coating also at a temperature of 160° C. and a hardening time of 1 h.

The plastisol as such is of conventional composition, as follows:

| | |
|---|---|
| Vinyl-chloride-based polymer | 10–50% by weight |
| Plasticiser | 20–50% by weight |
| Filler | 10–50% by weight |
| Viscosity modifier | 1–10% by weight |
| Stabiliser | 1–10% by weight |

Mixtures of different polymers as well as plasticisers and fillers may be used. The viscosity modifier used is, for instance, silicon dioxide. Usually, the stabilisers are metallic salts, such as dibutyl tin carboxylate and tribasic lead sulphate. Adhesion chemicals such as triethylene tetraamine may also be added.

The invention will now be illustrated in more detail by the following non-restricting Example. The figures in parts and per cent given below all relate to parts by weight and per cent by weight, unless otherwise stated.

EXAMPLE

A plastisol of the following composition was produced:

| | |
|---|---|
| PVC copolymer (with 5% vinyl acetate: Vinnol ® E5/65 L) | 213 |
| PVC copolymer (with 8% vinyl acetate: Vinnol ® C8/62 V) | 60 |
| Diisononyl phthalate | 390 |
| Filler (type CaCO$_3$: Durcal ® 5) | 200 |
| Filler (type CaCO$_3$: Socal ® P2) | 123 |
| Viscosity modifier (Silicon dioxide: Aerosil ® 200) | 10 |
| Tin stabiliser (Dibutyl tin carboxylate: Irgastab ® T9) | 4 |

To the composition was also added 1–1.5% of an adhesion chemical in the form of triethylene tetraamine (Euretec® 505). The plastisol was prepared in conventional manner by dispersing the polymer in the plasticiser and then adding the filler and the other additives. To this composition was added 1% by weight of microspheres, the polymer shell of which consisted of 90% of acrylonitrile and methacrylonitrile and 10% of methylmethacrylate, EXPANCEL® 091 DU.

As a comparison, to a similar plastisol were added, respectively, 1% by weight of microspheres whose polymer shell consisted of 50% of acrylonitrile, 25% of vinylidene chloride and 25of methylmethacrylate, EXPANCEL® 461 DU, as well as 1% by weight of microspheres whose polymer shell consisted of 45% of acrylonitrile, 45% of vinylidene chloride and 10% of methylmethacrylate, EXPANCEL® 551 DU. One thus obtained three coating compositions which only differed by the microsphere quality.

The coating compositions were pressurised to 100 bar. After 60 min, the compositions were sprayed onto metal sheets through a nozzle having a diameter of 375 µm. The thickness of the coating was 1 mm. The sheets were heated to 140°–160° C. for 60 min. SEM (Scanning Electron Microscope) photos of cross-sections of heated plastisols were taken to check up on the expansion of the microspheres and the presence of blisters. The density of the plastisols was measured after gelatinisation for 60 min at 150° C.

The SEM photos showed that in the plastisol with EXPANCEL® 091 DU the microspheres had expanded and that practically all the spheres were intact, which resulted in low density and an even coating surface. In the plastisols with EXPANCEL® 461 DU and 551 DU, on the other hand, most of the spheres had collapsed, which led to the release of propellant gas, the formation of blisters and high density. The following density values were obtained for the coatings: EXPANCEL 091 DU 1.0 g/cm$^3$; EXPANCEL 461 DU 1.17 g/cm$^3$; and EXPANCEL 551 DU 1.17 g/cm$^3$.

We claim:

1. A coating composition containing vinyl-chloride-polymer-based plastisol and expandable thermoplastic microspheres, said composition being suitable as an undercoating for cars, wherein the expandable thermoplastic microspheres have a substantially halogen-free polymer shell which comprises a copolymer of halogen-free monomers and, in an amount of at least about 80% by weight, nitrile-containing monomers.

2. A coating composition as claimed in claim 1, wherein the polymer shell of the thermoplastic microspheres contains from about 85% by weight to about 97% by weight of nitrile-containing monomer.

3. A coating composition as claimed in claim 1, wherein the polymer shell contains from about 3% by weight to about 15% by weight of halogen-free monomer.

4. A coating composition as claimed in claim 1, wherein the nitrile-containing monomer consists of acrylonitrile and/or methacrylonitrile.

5. A coating composition as claimed in claim 1, wherein the halogen-free monomer consists of methylmethacrylate and/or ethylmethacrylate and/or methylacrylate.

6. A coating composition as claimed in claim 1, wherein the thermoplastic microspheres are added to the plastisol in an amount of 0.1–5.0% by weight based on the plastisol.

7. A coating composition as claimed in claim 1, wherein the thermoplastic microspheres are added to the plastisol in an amount of 0.5–2.0% by weight based on the plastisol.

8. A method for spray-coating a surface with a coating composition containing vinyl-chloride-polymer-based plastisol and expandable thermoplastic microspheres, wherein the expandable thermoplastic microspheres have a substantially halogen-free polymer shell which comprises a copolymer of halogen-free monomers and, in an amount of at least about 80% by weight, nitrile-containing monomers, and the coating composition is applied by airless spraying.

9. A method for spray-coating a surface with a coating composition containing-vinyl-chloride-polymer-based plastisol and expandable thermoplastic microspheres, wherein the expandable thermoplastic microspheres have a substantially halogen-free polymer shell which comprises a copolymer of halogen-free monomers and, in an amount of from about 85% by weight to about 97% by weight, nitrile-containing monomers, and the coating composition is applied by airless spraying.

10. A method for providing protection from corrosion and impacts from stones on an automobile surface comprising coating the surface with a composition as claimed in claim 1.

11. A method for providing protection from corrosion and impacts from stones on an automobile surface comprising spray coating the surface according to the method of claim 8.

12. A method for providing protection from corrosion and impacts from stones on an automobile surface comprising spray coating the surface according to the method of claim 9.

* * * * *